L. F. HATZ.
VARIABLE SPEED GENERATOR.
APPLICATION FILED SEPT. 27, 1913.

1,183,006.

Patented May 16, 1916.

Witnesses:
Arthur Haegg.
George L Chindahl

Inventor:
Leonard F. Hatz.
By Luther L. Miller
Attorney.

UNITED STATES PATENT OFFICE.

LEONARD F. HATZ, OF CEDAR RAPIDS, IOWA.

VARIABLE-SPEED GENERATOR.

1,183,006.

Specification of Letters Patent.     Patented May 16, 1916.

Application filed September 27, 1913. Serial No. 792,088.

*To all whom it may concern:*

Be it known that I, LEONARD F. HATZ, a citizen of the United States, residing at Cedar Rapids, in the county of Linn and State of Iowa, have invented certain new and useful Improvements in Variable-Speed Generators, of which the following is a specification.

This invention relates to improvements in variable speed generators, and it has for its object the production of a generator intended to be used at varying speeds; and so constructed as to generate at all speeds a constant or uniform electro-motive force.

As is well known, the electro-motive force generated by an ordinary direct-current generator varies approximately in proportion to the speed of the generator, so that when, as is frequently the case, it is desired to use such a generator at varying speeds and also to generate a constant electro-motive force, it becomes necessary to use means for maintaining constant the electro-motive force in spite of the variations in speed. It is also well known that the electro-motive force of direct-current generators varies approximately as the magnetic flux passing through the armatures, so that if the flux through the armature is caused to vary in a proper relation to the speed, the electro-motive force will remain constant. As the electromotive force varies directly as the speed and also directly as the flux through the armature, it is evident that the electromotive force will remain constant if the product of the speed and the flux is constant.

In the past the product of the speed and the flux has been maintained substantially constant by the use of magnetically controlled resistances in the field and also by the use of "bucking" coils on the field. But it has been found that each of these methods of maintaining constant electromotive force with a generator has certain disadvantages, and it is one of the objects of this invention to produce a generator which will generate a substantially constant electromotive force at varying speeds, and that, while being entirely automatic in its action, will involve no objectionable features other than those that are inherent in any ordinary direct-current generator.

Figure 1:
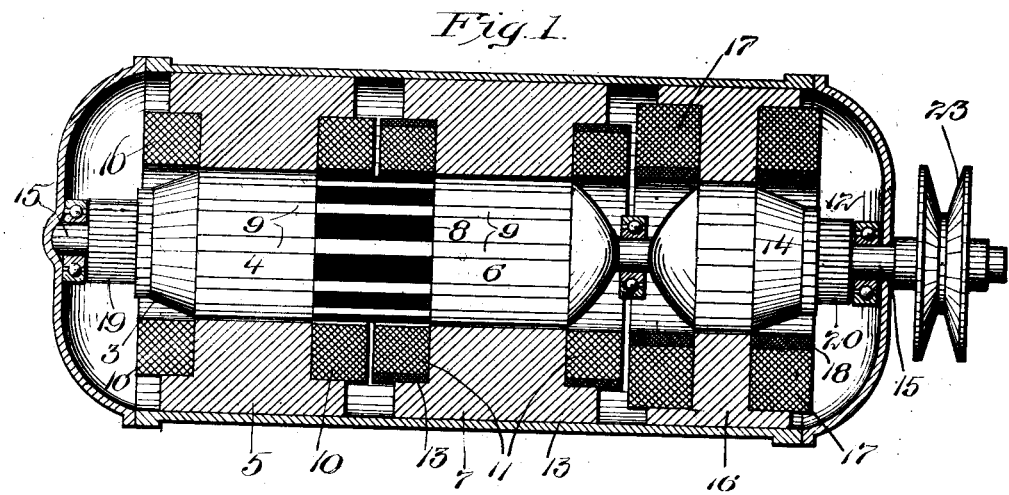
Figure 2:
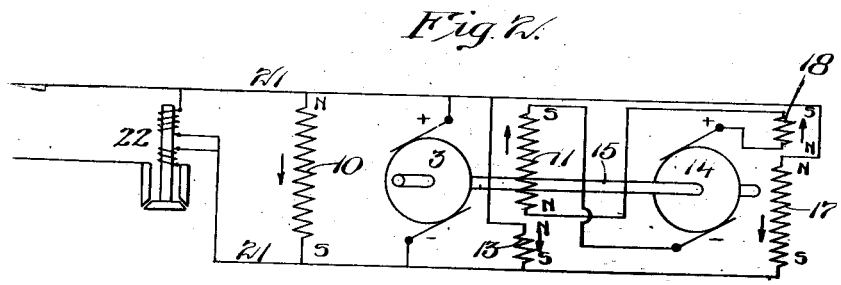

The accompanying drawings illustrate an exemplification of my invention. Figure 1 being a central longitudinal section of the generator, and Fig. 2 showing diagrammatically the connections of the various coils.

In carrying out my invention, I have so constructed the generator that the total magnetic flux through the armature 3 varies always inversely as the speed of the armature; and in order to accomplish this, I mount upon the main armature shaft 15 a secondary or exciter armature 14, the current of which is caused to energize the field coils 11 which oppose the action on the conductors of the armature 3 of the main field coils 10. With such an arrangement, it is evident that as the speed of the shaft increases the effect of the opposing field coils will increase; and if the strength of the main field coils remains constant, the result will be a decrease in the effect of the main field as the speed of the shaft increases.

When the main field coils 10 are energized by the main armature electro-motive force, it is not practicable to energize the opposing field coils 11 by the exciter electromotive force so as to vary the resulting magnetic effect on the main armature inversely as the speed, because as the voltage of the main armature is to remain constant, the main field coil strength will remain constant, and hence, although the opposing field effect would vary directly as the speed, yet the resulting magnetic effect would not vary inversely as the speed.

I find, however, that by use of an armature of such length that the fields 5 and 7 may be entirely independent, and by having the conductors of the armature pass under the influence of both fields, the effect of one field on the conductors being opposite to that of the other, the resultant effect of the two fields on the conductors may be made to vary inversely in proportion to the speed of the armature. This result becomes possible because of the fact that the field may then be made of different materials, and advantage may be taken of the difference in permeability of the respective materials. In order that the effect on the armature conductors of the opposing fields shall cause the total magnetic effect on the conductors to decrease at the same rate as the speed increases, in view of the fact that the main field-coil magnetic effect remains constant, it becomes necessary for the rate of increase, or the acceleration, of the opposing effect to diminish as the speed becomes greater. To accomplish this advantage is taken of the gradually diminishing increase in magnetization due to the decreasing permeability as the magnetic density of the opposing field increases. To bring about this result, I prefer to use for the opposing field of the generator material of low permeability, preferably cast iron, as I find that with cast iron of suitable magnetic permeability, as the magnetic density increases, the acceleration of the opposing effect with increased speed will suitably diminish.

In order to have the opposing field 7 produce the proper effect, I find also that it is desirable in some instances to have the opposing field substantially equal to zero when the generator armature is rotating at minimum generating speed. Evidently this will not be the case if the exciter when running below minimum speed produces an electromotive force which drives current through the opposing field coils. Therefore, in order to produce the desired result, I place on the opposing field, in addition to the coil 11, a neutralizing coil 13 which is energized by the main generator 3. This coil thus receives a constant electro-motive force and is so designed that its effect is substantially equal to the effect of the coil 11 when the armature shaft is rotating at minimum generating speed. The result is that this neutralizing coil at that speed completely neutralizes the effect of the coil 11, so that the opposing field is then equal to zero.

As a further means for adjusting the effect of the opposing field, I find it sometimes desirable to place a reverse coil 18 on the field 16 of the exciter 14, this coil being in series with the opposing field coil 11, and hence being energized by the exciter. I find that the magnetic characteristics of some qualities of cast iron are such that the increased density of the field 7 does not cause the acceleration of the opposing effect to diminish sufficiently rapidly, as the electromotive force of the exciter rises too rapidly. If the reverse field coil is used on the exciter, however, as the electro-motive force of the exciter increases, the effect of this reverse coil will increase and will diminish the resultant field of the exciter to such an extent as to cause the acceleration of the main armature opposing field to diminish at the proper rate.

By the use of proper materials and by proper designing, it will be found that, by the means referred to, the variation in the resultant magnetic effect on the conductors of the main armature will be substantially inversely as the variation in speed.

In this embodiment of my invention, I show the armature 3 of the generator composed of the section 4, which is under the influence of the main field 5, and the section 6, which is under the influence of the opposing field 7. The portion 8 of the armature, which lies between the sections 4 and 6, is composed of insulating material, but the slots 9 which carry, in the usual manner, the wire conductors of the armature, extend across all three sections of the armature as indicated.

The main field 5 of the generator is energized by the coils 10. These coils, as indicated in Fig. 2, are connected across the brushes of the main armature 3, forming shunt field coils in the ordinary manner. The opposing field 7 of the generator is energized mainly by the coils 11, which receive current from the exciter 12. As indicated in Fig. 2, the connections of the coils 10 and 11, to their respective armatures, are such as to cause the magnetic effect of the coil 11 on the conductors of the armature 3 to oppose the magnetic effect of the coil 10 on such conductors. Field coils 13 also affect the magnetism of the opposing field 7. These coils, as indicated in Fig. 2, are also connected across the brushes of the armature 3, and are so connected as to oppose the coils 11 and so designed as to neutralize the magnetic effect of the coils 11 when the armature is rotating at minimum speed. The armature 14 of the exciter 12 is, in this instance, directly mounted upon the shaft 15 of the generator. The armature 14 rotates under the influence of the field 16, which is energized mainly by the field coils 17. The coils 17 receive current from the main generator armature 3, being connected thereto in parallel with coils 10 and 13. Field 16 is also affected by the field coils 18, which receive current from the exciter and are connected in series with field coil 11. As indicated in Fig. 2, coils 18 are so connected as to oppose coils 17.

Each of the armatures, 3 and 14, have associated therewith, in the usual manner, the respective commutators 19 and 20, to the brushes of which are connected, as indicated above, the various field coils, and also across the brushes of the commutator 19 are connected the conductors 21, which supply current to the storage battery or elsewhere, through the automatic cut-out 22.

The shaft 15 of the generator may be rotated in any suitable manner. Herein I have shown for the purpose the pulley 23, which is connected by means of a driving belt with the driving machine.

In practice the operation of the generator is as follows: The construction is such that when the armature is rotating at minimum speed, the magnetic effect acting upon the conductors of the armature 3 produces at the brushes an electro-motive force substantially equal to that desired. By minimum speed is here meant the minimum speed at which the generator will be allowed to operate. Below this speed, by means of the automatic cut-out 22, or some other suitable device, the generator will be disconnected from the supply lines to the battery. As the electro-motive force generated by the armature 3 is to be constant, it is evident that the magnetic effect of coils 10, 13 and 17 will also be constant at all speeds of the generator. On the other hand, it is evident that coils 11 and 18 will vary in strength in magnetic effect somewhat in proportion to the speed of the armature 14.

If the speed of the shaft 15 for any reason increases, the constant magnetic effect of coil 13 will no longer be able to neutralize the increasing magnetic effect of coil 11. As a consequence the opposing field 7 of the generator will become effective and the opposing effect thereof on the conductors of the armature 3 will tend to decrease the electromotive force therein and to offset the increased tendency of such force due to the increased rotation of the conductors.

As indicated above, in order to maintain constant the product of the magnetic flux affecting the conductors of the armature 3 and the speed of the armature, it will be necessary for the opposing field effect to increase as the speed increases. But, because of the constant effect of coils 10 and 13, it will be necessary for the accelerating effect of coil 11 to diminish gradually as the speed increases. Also, as indicated above, by the use of suitable material, such as cast iron, for the field 7, the increased density of the field will cause a decrease in the acceleration of the opposing magnetic effect. And as the current passing through coil 18 increases materially with the increase in speed of the armature 14, while the current through coil 17 remains constant, it is evident that this coil 18, opposing coil 17, will cause the magnetic field 16 of the exciter to diminish in strength as the speed increases, and this in turn will also cause a diminution in the acceleration of the opposing magnetic effect due to coil 11. So that by properly selecting the material for the various fields and the armature cores, and by proper designing, the electro-motive force of the generator will be maintained substantially constant within reasonable limits of speed.

The generator may be used on automobiles for charging batteries and for lighting purposes, or in connection with locomotives for the same purposes, or with wind mills or other driving powers, or for various other purposes. When so used if the speed limits do not exceed the ratio of 5:1, there need be but very slight variation in the electro-motive force generated, and this ratio may be materially exceeded without very substantial variations in the electro-motive force.

It is evident that those skilled in the art could readily make many variations from the exemplification of my invention which I have illustrated and described, without departing from the scope of the invention as indicated by the following claims.

I claim as my invention:

1. The combination of an external source of electro-motive force and an electric generator, said generator comprising an armature, armature coils mounted on said armature, two independent sets of field poles each inclosing said coils, a set of main field windings adapted to energize one of said sets of field poles, and a second and a third set of field windings each adapted to affect the magnetization of the other set of field poles, the magnetizing effect of said third set of windings being opposed to that of said second set of windings and the magnetic effect on said armature coils of one of said sets of field poles being opposite to the magnetic effect on said coils of the other of said sets of field poles, said main field windings and said third set of windings being energized by said armature coils and said second set of field windings being energized by said external source of electromotive force.

2. An electric generating apparatus comprising a main armature and an exciter armature, armature coils mounted on each of said armatures, a main set of field poles affecting the coils of said main armature, and a secondary set of field poles affecting the electro-motive force generated in said armature coils oppositely to the effect of said main field poles, and a set of exciter field poles adapted to affect the electromotive force generated in said exciter armature coils, a set of field coils energized by said main armature coils and energizing said set of main field poles, a second set of field coils energized by said exciter armature coils and energizing said secondary set of field poles, and a third set of field coils energized by said main armature coils and affecting the magnetization of said secondary set of field poles.

3. An electric generating apparatus comprising a main armature and an exciter armature, armature coils mounted on each of said armatures, a main set of field poles and a secondary set of field poles, said two sets of field poles affecting oppositely the electro-motive force generated in said main armature coils, and a set of exciter field poles affecting the electro-motive force generated in said exciter armature coils; a set of field coils energized by said main armature coils, and energizing said main set of field poles, a second set of field coils energized by said exciter armature coils and energizing said secondary set of field poles, and a third set of field coils energized by said main armature coils and affecting the magnetization of said secondary set of field poles, the magnetic effect of said third set of field coils being opposite to the magnetic effect of said second set of field coils.

4. An electric generating apparatus comprising a main armature and an exciter armature, a main set of field poles, a secondary set of field poles and an exciter set of field poles, coils mounted upon said main armature and upon said exciter, the main field poles being energized by the main armature coils, the secondary field poles and the exciter field poles each being energized by the main armature coils and the exciter armature coils acting in opposition to each other, said main armature coils extending into the influence of said main field poles and said secondary field poles and being oppositely acted upon thereby.

5. An electric generating apparatus comprising an armature, said armature having a shaft, coils mounted on said armature, two independent sets of field poles affecting said coils, and an exciter having one field winding of constant strength the armature of said exciter having coils mounted thereon and being mounted on said shaft, one of said sets of field poles being energized by said main armature and said exciter armature coils acting in opposition to each other, and the other set of poles being energized by said armature coils.

6. An electric generating apparatus comprising an armature, coils mounted on said armature, two sets of magnetic field poles, and an exciter, each of said sets of magnetic field poles being adapted to be energized by said main armature, one of said sets of field poles being magnetically affected by the said exciter, said main armature and said exciter acting oppositely on said latter set of field poles, said exciter comprising a set of field poles and two sets of field coils, one of said sets of field coils being energized by said exciter and the other set being energized by said main armature.

7. A constant voltage electric generating apparatus comprising two armatures, a plurality of sets of field poles, and a plurality of sets of field coils, two of said sets of field poles differentially affecting one of said armatures, and two of said sets of field coils differentially affecting one of said differentially-acting sets of field poles, one of said differentially-acting sets of coils being energized by one of said armatures, and the other of said differentially-acting sets of coils being energized by the other of said armatures.

8. A constant voltage electric generating apparatus comprising two armatures, a plurality of sets of field poles and a plurality of sets of field coils; two of said sets of field poles differentially affecting one of said armatures, and two of said sets of field coils differentially affecting one of said differentially-acting sets of field poles, one of said sets of differentially-acting coils being energized by one of said armatures and the other of said sets of differentially-acting coils being energized by the other of said armatures, and two other of said sets of field coils differentially affecting said other armature and being respectively energized by the respective armatures.

9. In a constant voltage system, the combination with a rotatable armature, of a field pole, a field winding of constant strength on said pole, a second field pole, two windings thereon, one of said windings having constant electric strength, a second rotatable armature having a speed proportional to that of said first mentioned armature, said second armature being connected to the other coil on the second field pole, and a field for said second mentioned armature having a field winding thereon of constant strength.

In testimony whereof I affix my signature in presence of two witnesses.

LEONARD F. HATZ.

Witnesses:
G. C. BARBER,
MARCELLA MAHER.